United States Patent
Rakshit et al.

(10) Patent No.: US 12,086,891 B2
(45) Date of Patent: Sep. 10, 2024

(54) CUSTOMIZED IMAGE REACTION SUBMISSIONS AND VISUALIZATION ON SOCIAL NETWORKS

(71) Applicant: INTERNATIONAL BUSINESS MACHINES CORPORATION, Armonk, NY (US)

(72) Inventors: Sarbajit K. Rakshit, Kolkata (IN); Martin G. Keen, Cary, NC (US); James E. Bostick, Cedar Park, TX (US); John M. Ganci, Jr., Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 822 days.

(21) Appl. No.: 16/178,801

(22) Filed: Nov. 2, 2018

(65) Prior Publication Data
US 2020/0143482 A1    May 7, 2020

(51) Int. Cl.
*G06Q 50/00*    (2024.01)
*G06F 3/04817*   (2022.01)
(Continued)

(52) U.S. Cl.
CPC ......... *G06Q 50/01* (2013.01); *G06F 3/04817* (2013.01); *G06F 16/5866* (2019.01);
(Continued)

(58) Field of Classification Search
CPC .............. G06Q 50/01; G06Q 30/0209; G06F 16/5866; G06F 16/9535; G06F 3/04817;
(Continued)

(56) References Cited

U.S. PATENT DOCUMENTS 7,587,101 B1 * 9/2009 Bourdev ............... G06K 9/033
382/291
9,639,512 B1   5/2017 Carter
(Continued)

OTHER PUBLICATIONS

Kokalitcheva, "Facebook's Iconic 'Like' Button Gets More Emotional, fortune.com/2016/02/24/facebook-like-reactions/, Facebook Introduces 'Reactions' To Expand Beyond The 'Like' Button", Fortune.com, Feb. 24, 2016, 2 pages.

*Primary Examiner* — Andrew B Whitaker
*Assistant Examiner* — Shaun D Sensenig
(74) *Attorney, Agent, or Firm* — Robert Richard Aragona; Andrew D. Wright; Calderon Safran & Wright P.C.

(57) ABSTRACT

Systems and methods for generating customized image reaction submissions and visualizations on social networks are disclosed. In embodiments, a computer-implemented method includes: obtaining, by the computing device, user profile data of a user accessing an image on a social network, wherein the user profile data includes user interest categories of the user; determining, by the computing device, select content classes from a plurality of content classes associated with the image, wherein the select content classes match user interest categories of the user based on the user profile data; providing, by the computing device, selectable reactions to the user, wherein the selectable reactions each represent a different user reaction to the image; and providing, by the computing device, selectable content options to the user, wherein content option is associated with a different one of the content classes and is selectively associated, by the user, with at least one of the reactions.

20 Claims, 5 Drawing Sheets

(51) Int. Cl.
  *G06F 16/58* (2019.01)
  *G06F 16/9535* (2019.01)
  *G06T 11/40* (2006.01)
  *H04L 67/306* (2022.01)
  *H04L 67/50* (2022.01)

(52) U.S. Cl.
  CPC .......... *G06F 16/9535* (2019.01); *G06T 11/40* (2013.01); *H04L 67/306* (2013.01); *H04L 67/535* (2022.05)

(58) Field of Classification Search
  CPC ..... H04L 67/306; H04L 67/22; H04L 67/535; G06T 11/40; A63F 13/00; A63F 9/24; A63F 13/20; A63F 13/30; A63F 13/40; A63F 13/50; A63F 13/60; A63F 13/70; A63F 13/80; A63F 13/90; A63F 2300/00; A63F 2300/20; A63F 2300/30; A63F 2300/40; A63F 2300/50; A63F 2300/60; A63F 2300/80
  See application file for complete search history.

(56) References Cited

U.S. PATENT DOCUMENTS

| | | | |
|---|---|---|---|
| 10,871,877 B1 * | 12/2020 | Clediere | G06F 3/04817 |
| 2008/0204359 A1 * | 8/2008 | Tsui | G06F 1/1601 345/5 |
| 2011/0022529 A1 | 1/2011 | Barsoba et al. | |
| 2011/0038512 A1 | 2/2011 | Petrou et al. | |
| 2011/0179385 A1 * | 7/2011 | Li | G06F 16/7867 715/810 |
| 2013/0055079 A1 * | 2/2013 | Liao | G06F 16/58 715/701 |
| 2013/0055088 A1 * | 2/2013 | Liao | G06F 3/0484 715/730 |
| 2013/0262588 A1 * | 10/2013 | Barak | G06K 9/00221 709/204 |
| 2014/0164507 A1 * | 6/2014 | Tesch | H04L 51/10 709/204 |
| 2014/0201126 A1 * | 7/2014 | Zadeh | A61B 5/165 706/52 |
| 2014/0204215 A1 * | 7/2014 | Kriel | G01S 13/931 342/52 |
| 2016/0234266 A1 | 8/2016 | Harpur et al. | |
| 2017/0255654 A1 * | 9/2017 | Liao | G06F 16/54 |
| 2017/0300976 A1 | 10/2017 | Dogruoz et al. | |
| 2018/0041458 A1 * | 2/2018 | Hawkins | G06Q 50/01 |
| 2019/0130620 A1 * | 5/2019 | Christiansen | H04L 51/52 |
| 2019/0311189 A1 * | 10/2019 | Bryant, III | G06F 3/04845 |
| 2020/0065589 A1 * | 2/2020 | Fink | G10L 25/78 |

* cited by examiner

CUSTOMIZED IMAGE REACTION SUBMISSIONS AND VISUALIZATION ON SOCIAL NETWORKS

BACKGROUND

The present invention relates generally to content interactions on social networks and, more particularly, to customized image reaction submissions and visualizations on social networks.

Various social media applications have developed over time to include user interaction icons or symbols that enable users to express their reactions to content. For example, users may be able to select icons to express love, sadness, laughter, happiness, or anger in response to posted content. Some social media applications also utilize content recognition tools, such as image recognition tools (e.g., facial recognition tools) to recognize certain types of image content.

SUMMARY

In an aspect of the invention, a computer-implemented method includes: obtaining, by the computing device, user profile data of a user accessing an image on a social network, wherein the user profile data includes user interest categories of the user; determining, by the computing device, select content classes from a plurality of content classes associated with the image, wherein the select content classes match user interest categories of the user based on the user profile data; providing, by the computing device, selectable reactions to the user, wherein the selectable reactions each represent a different user reaction to the image; and providing, by the computing device, selectable content options to the user, wherein each selectable content option is associated with a different one of the content classes and is selectively associated, by the user, with at least one of the reactions.

In another aspect of the invention, there is a computer program product including a computer readable storage medium having program instructions embodied therewith. The program instructions are executable by a computing device to cause the computing device to: obtain user profile data of a user accessing a classified image on a social network, wherein the user profile data includes user interest categories of the user, and wherein the classified image is associated with content classes based on content of the classified image; determine one or more of the content classes that match one or more of the user interest categories of the user; provide selectable reactions to the user, wherein the selectable reactions each represent a different user reaction to the image; and provide selectable content options to the user, wherein each selectable content option is associated with the one or more of the content classes that match one or more of the user interest categories of the user, and each of the selectable content options are configured to be associated with one of the selectable reactions.

In another aspect of the invention, there is a system including a processor, a computer readable memory and a computer readable storage medium associated with a computing device; program instructions to obtain user profile data of a user accessing a classified image on a social network, wherein the user profile data includes user interest categories of the user, and wherein the classified image is associated with content classes based on content of the classified image; program instructions to determine content options based on one or more of the content classes matching one or more of the user interest categories of the user; program instructions to receive a user selection of one of the content options; program instructions to receive a user selection of a user reaction icon, wherein the user reaction icon represents the user's response to the classified image; and program instructions to render the classified image on the social network with reaction content superimposed thereon based on the user selection of the content option and the user selection of the user reaction icon; wherein the program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
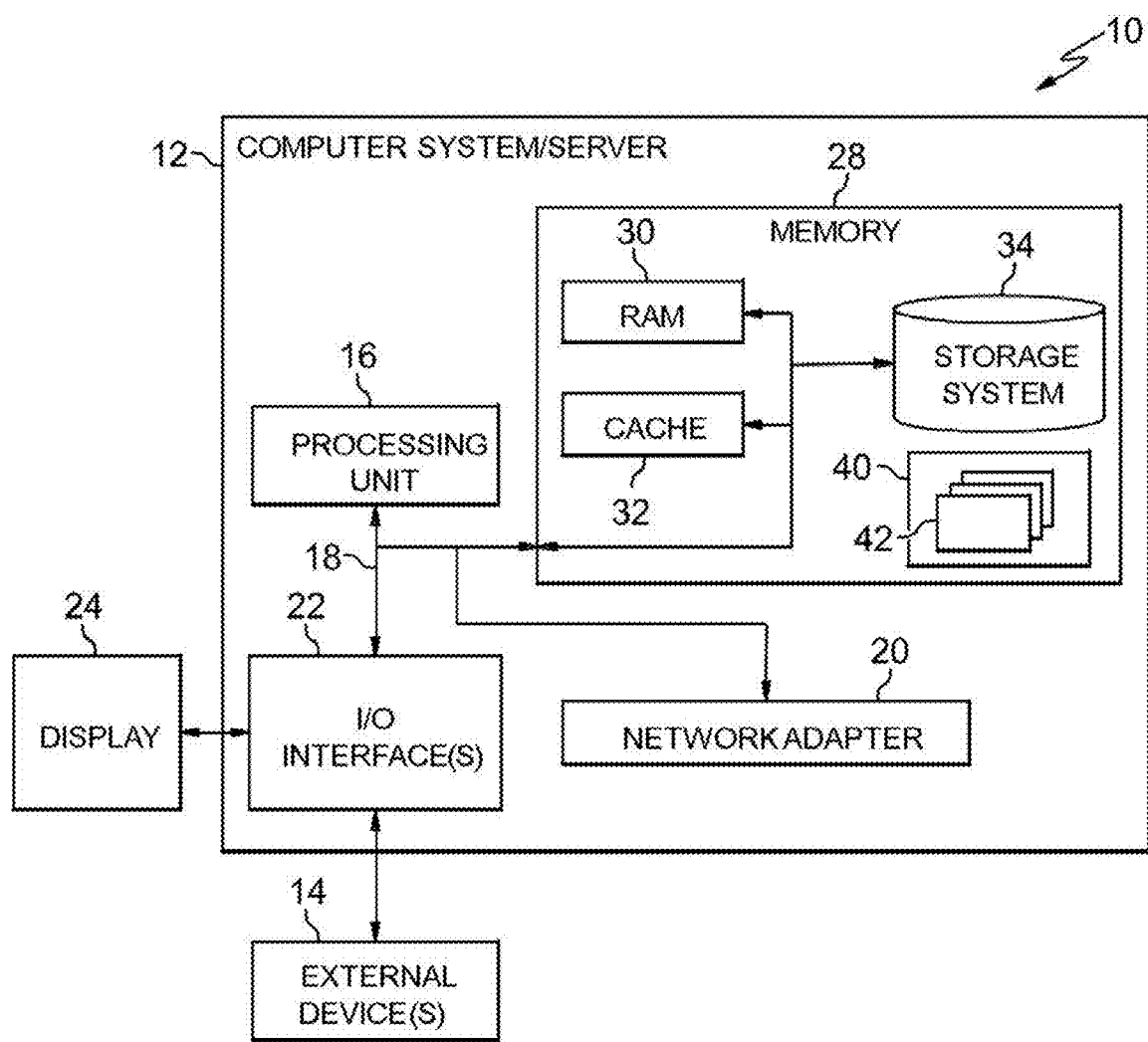
FIG. 1 depicts a computing infrastructure according to an embodiment of the present invention.

The present invention relates generally to content interactions on social networks and, more particularly, to customized image reaction submissions and visualizations on social networks. In embodiments, a cognitive system is provided for: classifying people, objects, surroundings and/or conditions in an image (e.g., photograph) shared on a social network; deriving options personalized for a user representing different conditions in the photograph (e.g., a puppy running, a sunny day); and rendering user reaction icons over an appropriate portion of the image based on a user selection of an option (e.g., a heart icon superimposed near the running puppy in the photograph).

Social networks have developed which enable users to assign icons to a photograph posted on the social network, wherein the icons represent a reaction such as "like", "love", "wow", "sad", "angry", etc. These reaction icons relate to the photograph or content posting as a whole. However, multiple types of information may be conveyed by a photograph, including the presence of human and non-human objects, the location, contextual factors such as a sunrise, etc. Assigning a single reaction to an entire photograph does not illustrate what a given user is reacting to in a photograph. For example, one user can be reacting to the scenery in a photograph and another user may be reacting to people pictured in the photograph. Advantageously, embodiments of the present invention provide a method for granular and personalized assignment of user reactions to images in social networks, and enable the generation of a more detailed user profile for a given social network user's preferences. Such functionality improves user experience while providing the potential for more targeted advertising to users. In particular, embodiments of the invention call out elements of a photograph that a particular social network user is likely to want to react to. In aspects, the social network user can then assign multiple reactions to a single photograph, whereby each reaction applies to a specific element or grouping of elements in the photograph. In implementations, these reactions are rendered in aggregate onto the photograph when viewed on the social network.

Accordingly, embodiments of the present invention constitute technical improvements in the field of social networks. In aspects, a system performs the unconventional steps of: deriving singe-classification and multiple-classification user reaction options for a user based on contextual analysis of a photograph and user profile information; and rendering user reaction icons over select portions of the photograph based on a user selection of the reaction options. In this way, embodiments of the invention constitute improvements to the technical field of social network servers, by adding functionality (e.g., adding novel user interactive features) to the social network servers.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
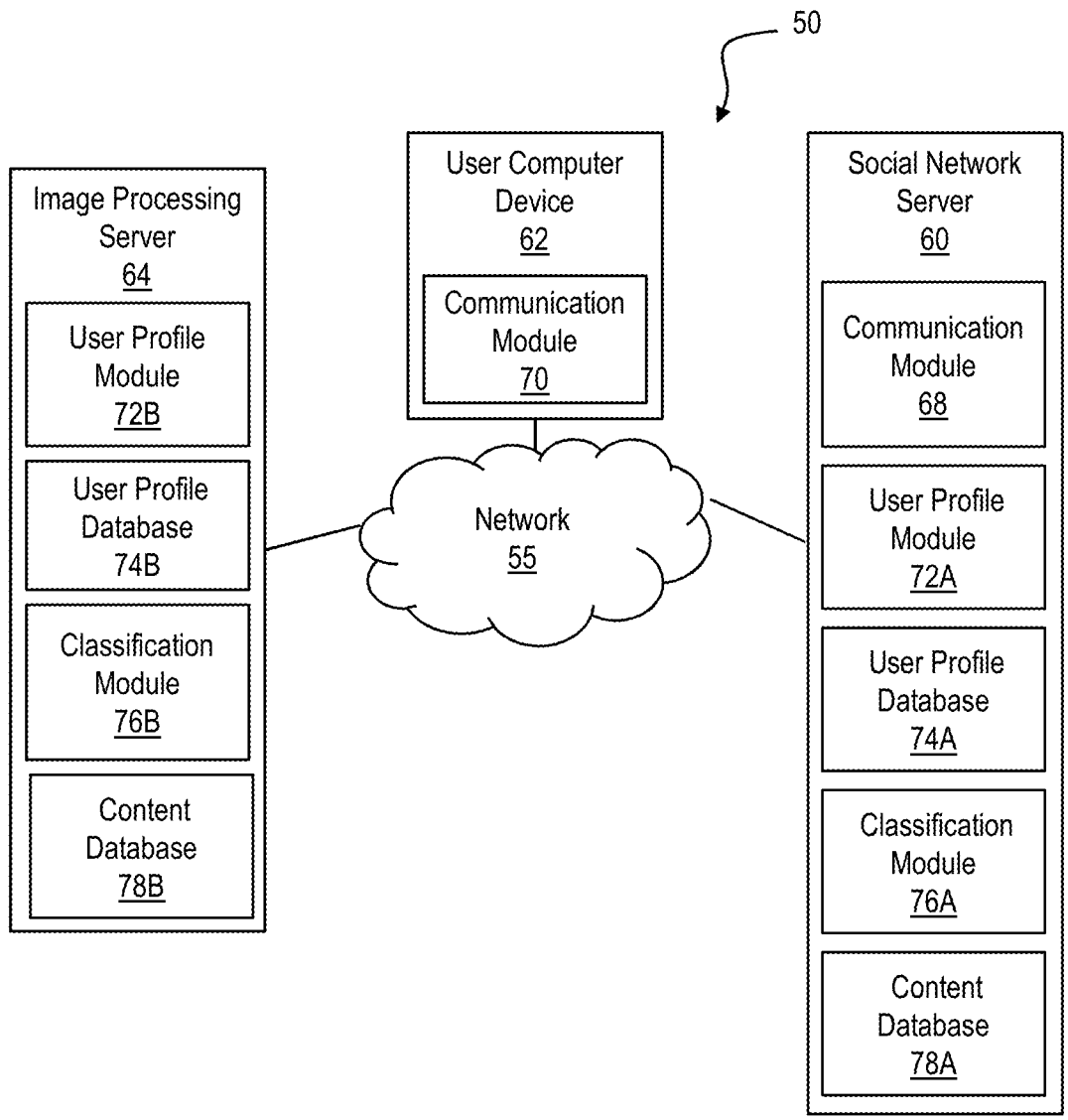
FIG. 2 shows an exemplary environment in accordance with aspects of the invention.

FIG. 2 shows an exemplary interactive image environment 50 in accordance with aspects of the invention. The interactive image environment 50 includes a network 55 connecting a social network server 60 with a plurality of user computer devices represented at 62. In embodiments, the interactive image environment 50 also includes an image processing server 64 in communication with the social network server 60 via the network 55. In aspects, the social network server 60 comprises the computer system 12 of FIG. 1, and is connected to the network 55 via the network adapter 20 of FIG. 1. The social network server 60 may be configured as a special purpose computing device that is part of a social media infrastructure. For example, the social network server 60 may be configured to receive content from user computer devices 62, and post the content on a social media interface for sharing with members of the social media network.

The network 55 may be any suitable communication network or combination of networks, such as a local area network (LAN), a general wide area network (WAN), and/or a public network (e.g., the Internet). Each user computer device 62 may include components of the computing device 12 of FIG. 1, and may be a desktop computer, laptop computer, tablet computer, smartphone, or other computing device. In embodiments, each user computer device 62 runs a browser application program that provides an interface (e.g., a web page) by which a user may interact with a social media network provided by the social network server 60. In embodiments, the social network server 60 is configured to communicate with different user computer devices 62 simultaneously.

In embodiments, the image processing server 64 comprises components of the computing device 12 of FIG. 1. In aspects, modules of the image processing server 64 comprise program modules 42 of FIG. 1. In aspects, the image processing server 64 is a specialized computer configured to provide cloud-based image processing services to one or more social network servers 60.

Still referring to FIG. 2, the social network server 60 comprises one or more program modules (e.g., program module 42 of FIG. 1) configured to perform one or more functions described herein. In embodiments, the social network server 60 includes a communication module 68 configured to implement communications between the social network server 60 and communication modules 70 (e.g., program modules 42 of FIG. 1) of respective user computer devices 62. In aspects, the social network server 60 includes a user profile module 72A configured to receive and/or generate user profile data for storage in a user profile database 74A. In implementations, the social network server 60 includes a classification module 76A configured to classify images of a social media network provided by the social network server 60, and store the classified images in a content database 78A. In aspects, the classification module 76A is further configured to render supplemented images with reaction content (e.g., icons) superimposed therein to convey to a viewer a user's reaction to one or more aspects of the image.

In alternative embodiments, one or more of the user profile module 72A, user profile database 74A, classification module 76A and content database 78A are located remotely from the social network server 60. In implementations, the image processing server 64 includes a user profile module 72B configured to receive and/or generate user profile data for storage in a user profile database 74B and/or a classification module 76B configured to classify images of the social media network provided by the social network server 60, and store the classified images in a content database 78B. In implementations, the image processing server 64 provides cloud-based services to one or more social network servers 60, including obtaining and/or generating user profile data for use by the social network server 60 and/or generating classified images for use by the social network server 60.

The quantity of devices and/or networks in the interactive image environment 50 is not limited to what is shown in FIG. 2. In practice, the interactive image environment 50 may include additional devices and/or networks; fewer devices and/or networks; different devices and/or networks; or differently arranged devices and/or networks than illustrated in FIG. 2. Also, in some implementations, one or more of the devices of the interactive image environment 50 may perform one or more functions described as being performed by another one or more of the devices of the interactive image environment 50. Devices of the interactive image environment 50 may interconnect via wired connections, wireless connections, or a combination of wired and wireless connections. Moreover, additional or fewer modules than those shown in the interactive image environment 50 may be utilized, and the function of various modules may be combined.

Figure 3:
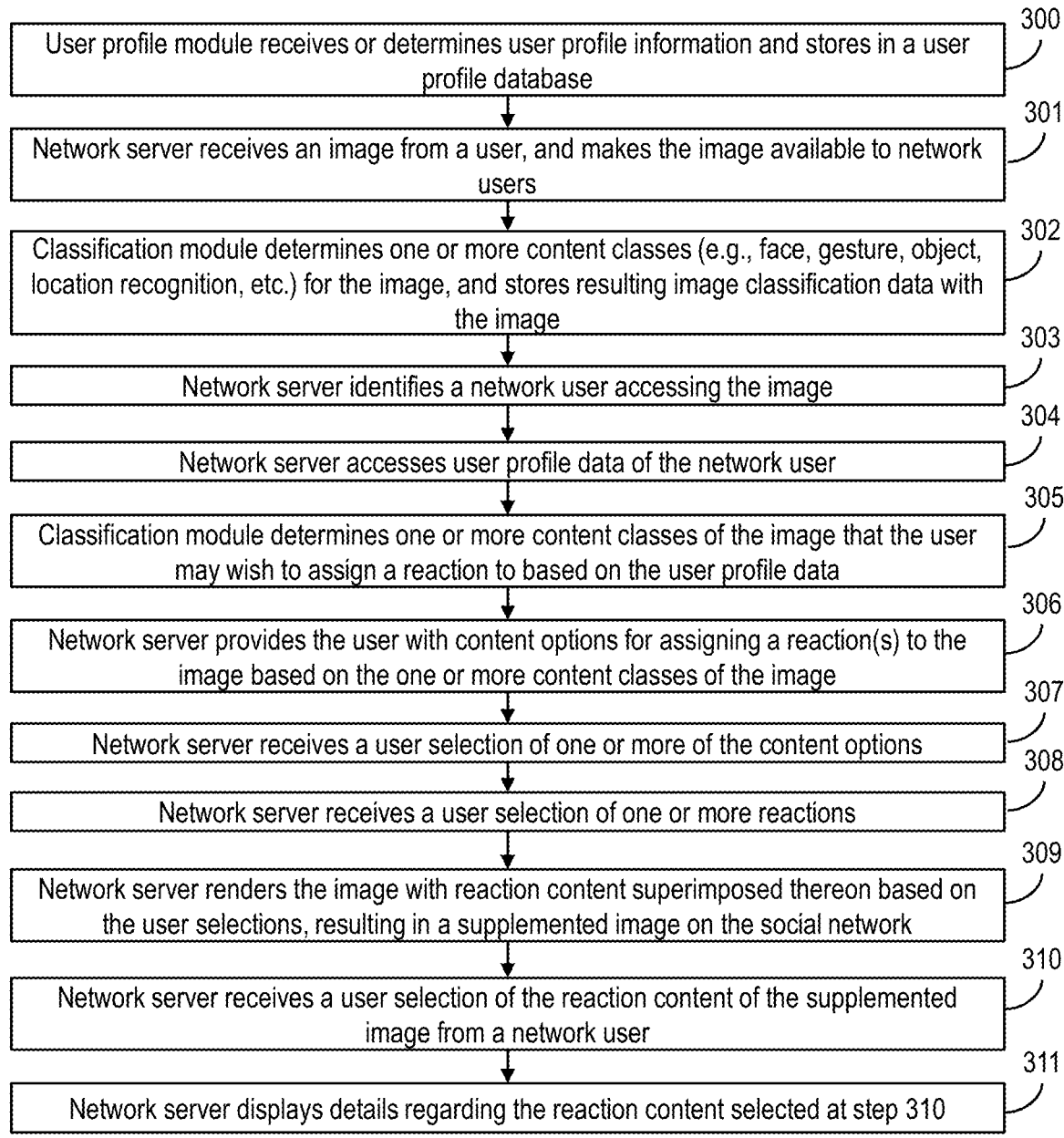
FIG. 3 shows a flowchart of steps of a method in accordance with aspects of the invention.

FIG. 3 shows a flowchart of a method in accordance with aspects of the invention. Steps of the method of FIG. 2 may be performed in the environment illustrated in FIG. 2, and are described with reference to elements shown in FIG. 2.

At step 300, the social network server 60 receives and/or determines user profile information and stores the user profile information in the user profile database 74A. In embodiments, the user profile module 72A of the social network server 60 implements step 300. User profile information may include any information useful to the social network server 60 in determining images of interest to a user, such as content classification areas of interest to a user. In embodiments, user profile information includes one or more of social network contacts or "friends" of the user, content of interest to the user, user interests derived from previous user interactions (e.g., user interactions within the social network provided by the social network server 60), and combinations thereof. In aspects, the social network server 60 mines authorized user data to determine classification areas of interest to the user. For example, in embodiments, the social network server 60 determines classification areas of interest to the user (e.g., sports, people, animals, etc.) by analyzing user interactions (e.g., likes, clicks, etc.) with content of the social network. In embodiments, the social network server 60 retrieves a user profile of the user to derive their likes, dislikes, and interests. The user profile may be derived from an analysis of various sources (as authorized by the user), including social network posts posted by the user; engagement (likes, comments, shares, etc.) with social network posts; and people, interest groups, and/or businesses that the user follows on one or more social networks. In aspects, content of interest to a user may be determined by the social network server 60 using information received directly from a user, such as through a questionnaire provided by the social network server 60.

In alternative embodiments, the user profile module 72B of the image processing server 64 receives and/or determines user profile information and stores the user profile information the user profile database 74B. In implementations, the user profile module 72B utilizes the same methods discussed above with respect to the user profile module 72A to obtain or derive user profile information. In embodiments, the user profile information stored in the user profile database 74B is shared with the social network server 60, and the social network server 60 stores the user profile information obtained from the image processing server 64 in the user profile database 74A. In aspects, the image processing server 64 comprises a cloud-based service providing user profile information to the social network server 60.

At step 301, the social network server 60 receives an image (still or moving) from a user, and makes the image available to users of the social network server 60 (e.g., through the communication modules 70 of the respective user computer devices 62). In embodiments, the image is in the form of a digital image or a digital video, such as a Joint Photographic Experts Group (JPEG) file, a Graphic Interchange Format (GIF) file, a Portable Network Graphic (PNG) file, a MP4 digital multimedia container format, or other digital image or video formats. The social network server 60 may utilize various social network methods and tools in the implementation of step 301.

At step 302, the social network server 60 determines one or more content classes for the image of step 301, and stores resulting image classification data with the image in the content database 78A. In implementations the classification module 76A of the social network server 60 determines the one or more content classes for the image utilizing image processing and/or natural language processing (NLP) tools. In aspects, the social network server 60 utilizes a variety of content and context recognition tools, which may include image recognition tools, text recognition tools, and/or speech to text recognition tools. Various methods may be utilized to store the image classification data with the image, including the use of image metadata, for example.

In embodiments, content classes determined according to step 302 include one or more of the following: people, places, things, and actions. For example, the classification module 76A may determine that a photograph uploaded to the social network server 60 by a user: includes an image of a friend of the user; the user is at the beach; and the friend is building a sand castle. Step 302 may utilize the image as well as any associated data (e.g., text-based content associated with the image) in the implementation of step 302. In embodiments, the social network server 60 utilizes cognitive analysis of an image to derive: face recognition of people captured in the image (e.g., photograph); gesture recognition performed by people captured in the image; object recognition; location recognition; and/or other classifications (e.g., blue skies, rain, tone of image, etc.).

In alternative embodiments, the classification module 76B of the image processing server 64 implements the image classification of step 302. In implementations, the classification module 76B utilizes the same methods discussed above with respect to the classification module 76A to determine one or more content classes for the image of step 301, and store resulting image classification data with the image in the content database 78B of the image processing server 64. In embodiments, the image classification data stored with the image in the content database 78B is shared with the social network server 60, and the social network server 60 stores the image classification data obtained from the image processing server 64, and the associated image, in the content database 78A. In aspects, the image processing server 64 comprises a cloud-based service providing the image classification data to the social network server 60. In aspects, the classification module 76B of the image processing server 64 receives the image from the social network server 60, and returns the image classification data for the image to the social network server 60 for storage with the image in the content database 78A of the social network server 60.

At step 303, the social network server 60 identifies a network user accessing the image of step 301 shared by the social network server 60. A variety of tools may be utilized in determining a user who is accessing (e.g., viewing, clicking on or otherwise selecting) the image. In aspects, social network users view the image posted on their social network feed (on their user computer device 62), which is provided by the social network server 60.

At step 304, the social network server 60 access the user profile data of the network user identified at step 303. In aspects, the social network server 60 accesses user profile data in the user profile database 74A. Additionally, or alternatively, in embodiments the social network server 60 accesses user profile data in the user profile database 74B of the image processing server 64.

At step 305, the social network server 60 determines one or more content classes of the image that the user may wish to assign a reaction to, based on the user profile data of the user. In aspects, the social network server 60 matches one or more content classes associated with the image from the image classification data generated at step 302, with one or more content classes in the user profile data which are listed as content classes of interest to the user. In implementations, software of the social network server 60 analyzes the social network user's interest profile (user profile) with the classifications of the image derived at step 302. In instances, the social network server 60 is configured to determine a user's interest areas that match classifications in the image (e.g., photograph). In one example, the image classification data generated at step 302 indicates that an image includes a person Jane, at the beach, performing the act of building a sand castle. In this example, the social network server 60 determines that Jane is a contact of the user within the social media network (i.e., Jane is a match with contact data in the user profile data), and determines that the user may be interested in the subject matter of the image based on the fact that the user often comments on images posted by Jane. Thus, in this instance, the social network server 60 determines that the user may wish to assign a reaction to one or more of the content classes: (1) Jane; (2) the beach; and (3) Jane building a sand castle. In another example, a photograph contains flowers and a puppy. The social network server 60 determines that the user accessing the photograph has a puppy (established from analyzing prior posts) and has expressed positive sentiment to other posts related to pictures of flowers. In this case, the social network server 60 determines that there is a match between the user's interests and content of the photograph. In aspects, the classification module 76A of the social network server 60 implements step 305.

In alternative embodiments, the classification module 76B of the image processing server 64 implements step 305. That is, in implementations, the classification module 76B utilizes the same methods discussed above with respect to the user classification module 76A to determine one or more content classes of the image that the user may wish to assign a reaction to, based on the user profile data of the user stored in the user profile database 74B and the image classification data in the content database 78B, or user profile data and image classification data in the user profile database 74A and the content database 78A accessed by the image processing server 64. In aspects, the image processing server 64 constitutes a cloud-based service providing the social network server 60 with the one or more content classes of the image that the user may wish to assign a reaction to. In aspects, the classification module 76B of the image processing server 64 receives a notification from the social network server 60 that a user identified at step 303 is accessing the image (as determined at step 303), and provides the social network server 60 with the one or more content classes of the image that the user may wish to assign a reaction to, in response to the notification.

At step 306, the social network server 60 provides the user with one or more content options for assigning one or more reactions to the image based on the image classification data. In aspects, the social network server 60 considers two forms of classification reactions: single-classification reactions and multiple-classification reactions. A single classification reaction as used herein refers to single instance of a content class (e.g., people, objects, actions or locations) that are present in an image, and that match a user's derived interest areas and connections (from the user profile data). Examples of single-classification reactions include: a particular person the user is friends with on the social media network; sunny weather;

and the presence of birds in the image. Multiple-classification reactions as used herein refer to instances of content classes (e.g., a combination of people, objects, actions and/or locations) in an image that, when considered together, may be assigned a reaction. These classifications, when combined, match a user's derived interest areas. Examples of multi-classification reactions include: a puppy, and the puppy is running; a friend and the friend is holding a puppy; a puppy and the puppy is holding a ball; and sunny weather in combination with a friend and a puppy.

Still referring to step 306, in implementations the social network server 60 provides users with selectable content options for assigning reactions to select content of the image, wherein the selectable content options are based on the determination of step 305. In embodiments, the one or more content options for assigning a reaction are in the form of selectable text-based options, which are descriptive of the one or more content classes of the image that the user may wish to assign a reaction to base on the user profile data. In one example, the social network server 60 provides a user with selectable text-based options, wherein a first option lists Jane (the user's social media contact shown in the image), the second option lists the beach (the location of the image), and the third option lists building a sand castle (the action being performed in the image). Thus, in this example, the user has the option of assigning reactions to different elements of the image, including Jane, the beach, and building a sand castle, utilizing the selectable options provided to the user by the social network server 60. It should be understood that the content options of step 306 are personalized to the particular user viewing the image, and another user with different interests and connections may see a different set of content options to assign reactions to.

At step 307, the social network server 60 receives a user selection of the one or more options for assignment of a user reaction. In embodiments, the user selection is in the form of a user clicking or otherwise selecting a selectable option presented to the user by the social network server 60. For example, the social network server 60 may receive a user selection of a text-based option listing Jane (the user's social media contact shown in the image), via a user interface provided through the communication module 70 of the user computer device 62.

At step 308, the social network server 60 receives a user selection of one or more selectable reactions to the image. In aspects, the selectable reactions are in the form of icons, such as emoji, which may be selected by a user to convey a reaction (e.g., feeling or action). In embodiments, the selectable reactions are animated icons. In one example, icons representing approval, love, happiness, sadness and/or other emotions are made available to a user with the image of interest (i.e., the image accessed at step 303). In embodiments, the user selection is in the form of a user clicking or otherwise selecting a selectable icon presented to the user by the social network server 60. For example, the social network server 60 may receive a user selection of heart icon (indicating the user's love for one or more aspects of the image), via a user interface provided through the communication module 70 of the user computer device 62. In embodiments, steps 307 and 308 may be performed simultaneously, or consecutively in any order. In embodiments, the user can assign multiple reactions to a single image content item; for example: Louis is smiling="love"; and Louis is holding a kite="wow".

At step 309, the social network server 60 renders the image with reaction content superimposed thereon, based on the user's selections of steps 307 and 308, resulting in a supplemented image shared on the social media network. In implementations, the social network server 60 renders the image with reaction content (e.g., text-based or image based reaction content) superimposed thereon near the associated content of interest to the user. In aspects, the reaction content is shown as a smaller image or icon superimposed over a portion of the larger image of interest (i.e., the image accessed at step 303), wherein the portion of the image of interest is associated with the selected content option (e.g., text-based option). In one example, the user selects the text-based content option of Jane (the user's social media contact shown in the image) and a heart emoji, wherein the social network server 60 renders a supplemented image including a heart emoji (i.e., user reaction icon) superimposed over the image near Jane.

In embodiments, reaction content (e.g., user reaction icon) is representative of the selected user reaction. For example, in the case where a user selects an emoji indicating laughter, the social network server 60 may render a supplemented image including the text "Ha!" superimposed over content of interest in the image. Thus, embodiments of the invention enable a user to associate reaction content indicative of their reaction, to one or more aspects of an image. Advantageously, methods of the present invention enable a user to express their reactions to an image in a more precise way than conventional social media networks. Embodiments of the invention enable single-classification reactions, wherein a reaction icon is statically rendered over the classified content of the image receiving the reaction. For example, if a reaction relates to a particular person, the reaction icon is placed near the person's face. Additionally, embodiments of the invention enable multiple-classification reactions, wherein a reaction icon is animated to indicate the multiple classifications that are addressed by the assigned reaction. For example, if a user reaction relates to a friend holding a puppy, the reaction icon is animated to move back and forth between the friend and the puppy. In embodiments, the reaction content itself is selectable by a viewer, as is discussed in more detail below with respect to step 310.

At step 310, reaction content of the image is selectable, and the social network server 60 receives a user selection of the reaction content of the supplemented image from a network user. In aspects, the social network server 60 determines at step 310 that a user has clicked on, hovered over, or otherwise selected reaction content of a supplemented image. In one example, the social network server 60 receives a user selection of a heart icon in the supplemented image, wherein the heart represents a user's response to content (e.g., the beach) depicted in the supplemented image. In embodiments, a viewer can tap or otherwise select an item of reaction content to reveal textual classifications associated therewith. For example, by tapping on a "wow" icon rendered on a photograph, a user sees that the reaction relates to "Louis is holding a kite".

At step 311, the social network server 60 displays details regarding the reaction content selected at step 310. In aspects, the details include the content option selected by the user at step 307 which is associated with the reaction content (and thus the user reaction selected at 308). In one example, the social network server 60 displays the text-based content option "the beach" at step 311, indicating to the viewer that the heart icon (reaction content) selected at step 310 was posted in reaction to the beach portion of the image of interest.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Based on the above, it can be understood that embodiments of the present invention provide a method to: derive which elements of a photograph a given social network user may wish to assign a reaction to (e.g., a puppy, a friend, sunny weather, a kite shown in the photograph); enable a social network user to assign an individual reaction to each derived element or combination of elements (e.g., assign "wow" to "puppy is holding a kite"); and render aggregate reactions to a photograph including animated icons showing which combination of elements a given reaction relates to (e.g., render the "wow" icon and move it between the puppy and the kite.

Based on the above, it can also be understood that embodiments of the invention provide a system including a cognitive system (e.g., classification modules 76A and 76B) for classifying people, objects, surroundings, and conditions in an image shared on a social network (e.g., via the social network server 60). Such systems enable users of the social network to view a classified image, while also comparing the classifications in the classified image to the user's interest areas as derived from their user profile (e.g., user profile data in the user profile database 74A and/or 74B). In embodiments, systems of the invention derive single-classification and multiple-classification reaction instances personalized to the social network user, wherein the social network user is enabled to assign a reaction to each classification grouping. Moreover, systems of the invention render user reactions on top of the classified image, indicating to viewers that classifications(s) the reaction relates to.

Figure 4A:
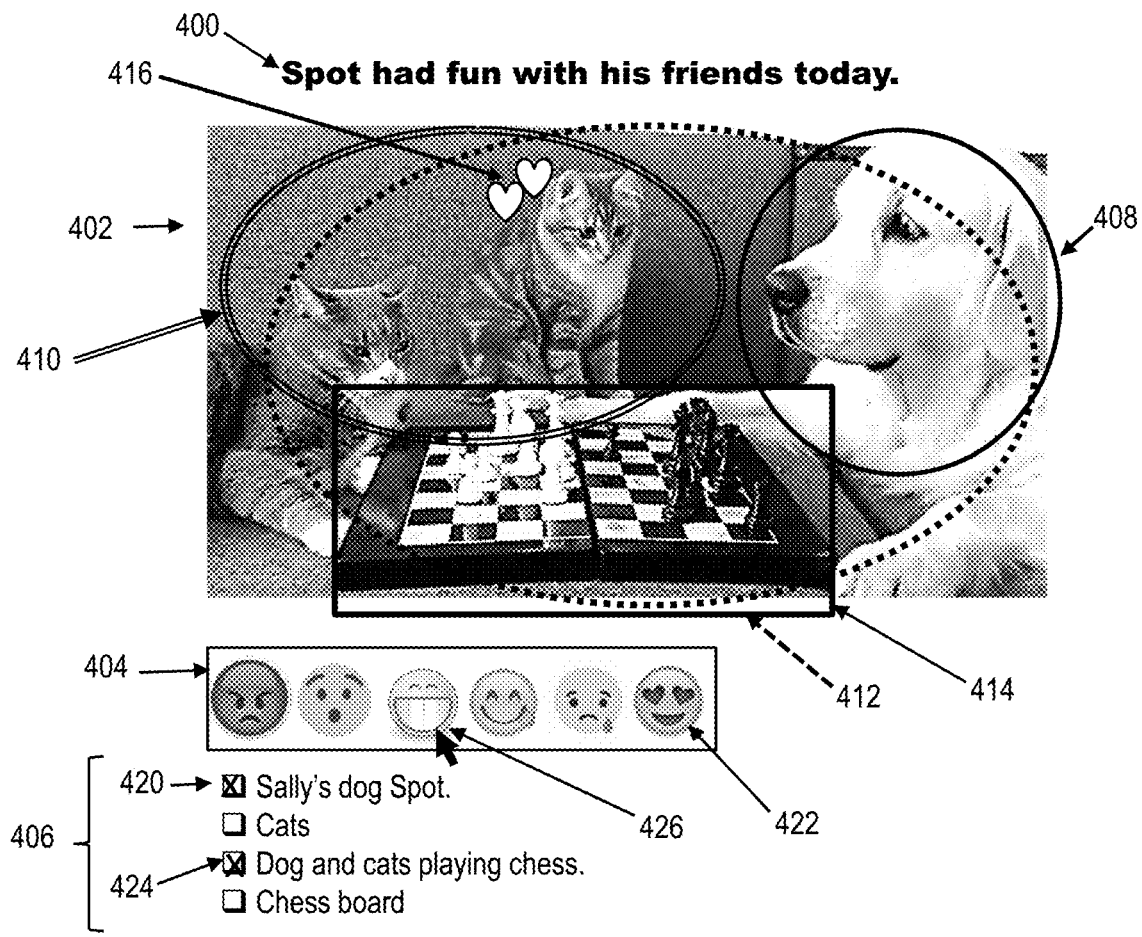
FIGS. 4A and 4B depict an exemplary use scenario in accordance with embodiments of the invention.
Figure 4B:
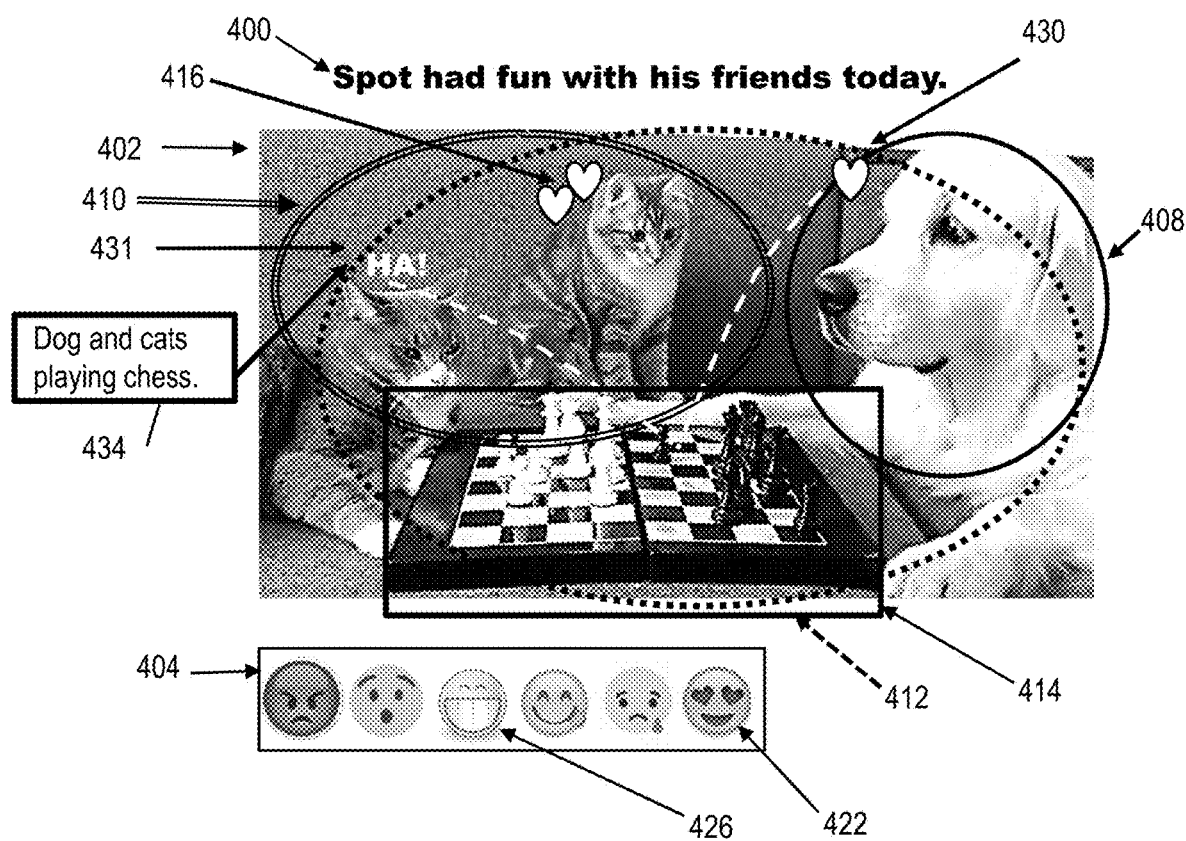

FIGS. 4A and 4B depict an exemplary use scenario in accordance with embodiments of the invention. The scenario of FIGS. 4A and 4B may be implemented utilizing the methods of FIG. 3 in the environment of FIG. 2.

Turning to FIG. 4A, an exemplary social media posting is depicted including a caption 400, a supplemented photograph 402, selectable user reaction icons 404 (representing potential user reactions), and selectable content options 406. The photograph 402 is received and processed by the social network server 60 in accordance with steps 301-305, and the social network server 60 provides the selectable content options 406 to a first user in accordance with step 306. Thus, the selectable content options 406 are personalized to the first user based on their own interest areas as derived from their user profile data (e.g., user profile data in the user profile database 74A or 74B).

In the example of FIG. 4A, the classification module 76A has identified content classes in the photograph 402, including: Sally's dog Spot 408, cats at 410, dog and cats playing chess at 412, and the chess board at 414. Selectable reaction content in the form of heart icons are shown superimposed over the image 402 at 416. In this example, a selectable heart icon 416 is shown over the image of one of the cats. The reaction content (heart icons 416) represent aggregate posted reactions from other users of the social media network. In accordance with embodiments of the invention, when other users view the same photograph, they see each reaction (reaction content) rendered on the photograph as depicted in FIG. 4A. In this scenario, the first user clicks on the content option 420 and an associated emoji 422 (representing love). The first user also clicks on the content option 424 and an associated emoji 426 (representing laughter).

Turning to FIG. 4B, the social network server 60 renders the photograph 402 with the first user's reaction content 430 (a heart icon) and 432 (the text "HA!") superimposed thereon, based on the first user's selection of content options 420, 424 and associated reactions 422, 426 (depicted in FIG. 4A). In this example, the first user's selection of emoji 422 with the content option 420 results in a heart icon 430 being superimposed over the photograph in the area of Spot 408. Further, the first user's selection of emoji 426 with the content option 424 results in the text "HA!" being superimposed over the photograph in the area as a moving icon, which moves between the cats 410, the chessboard 414 and the dog Spot 408 (as represented by the dashed line). In this example, viewers (first and second users, as well as other users of the social network server 60) are able to view details regarding the posted reaction content 430 and 432 by selecting the posted reaction content 430 and 432, in accordance with steps 309 and 310 of FIG. 3.

FIG. 4B illustrates a scenario wherein a second user selects the selectable reaction content 432 "Ha!", and is presented with details regarding the reaction content 432 of the first user in the form of a text box 434 indicating the content option 424 of FIG. 4A selected by the first user according to step 307 of FIG. 3. Thus, viewers of the photograph of FIG. 4B can view aggregate reactions of various users, as well as details regarding the reactions.

Advantageously, systems of the present invention derive which combination of objects and people in a photograph posted on a social network a user may wish to assign individual reactions to; enables a user to assign single and multiple-classification reactions to the photograph, whereby the classifications selected are personalized to a derived user profile of the user; and render single and multiple-classification reactions onto the photograph, including animation to indicate the parts that make up a multi-classification reaction.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for multi-dimensional user reaction submission and visualization of content. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

One exemplary method of the present invention provides for multi-dimensional user reaction submission and visualization with social network content. The exemplary method includes: classifying a photograph shared on a social network based on object recognition, location, tone, facial recognition, etc.; analyzing a social network user profile to derive interest areas related to other photograph classifications; deriving single-classification (a singular object, item, expression, etc.) and multiple-classification reaction (a combinations of objects, expressions, items, etc. that together match interests) instances personalized to the social network user; and presenting to the social network user personalized possible reactions to a photograph based on the derived classifications. In aspects, the method further includes rendering the reactions onto a post, photo, etc. of the social media network, wherein the rendered reaction or reactions are placed near the object, item, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    obtaining, by a computing device, user profile data of a user in response to the user accessing a digital image on a social network, wherein the user profile data includes user interest categories of the user;
    determining, by the computing device using a cognitive image analysis, a plurality of content classes associated with content of the digital image using computer-based image processing tools;
    determining, by the computing device using the cognitive image analysis, select content classes from the plurality of content classes associated with content of the digital image, wherein the select content classes match user interest categories of the user based on the user profile data;
    determining, by the computing device, at least one combination of contents in the digital image corresponding to at least two of the select content classes;
    providing, by the computing device, selectable reactions to the user via a social network user interface, wherein the selectable reactions each represent a different user reaction to the digital image;
    providing, by the computing device, selectable text-based content options associated with content objects of the digital image to the user via the social network user interface based on the select content classes;
    receiving, by the computing device, a user selection of a multi-classification reaction via the social network user interface, thereby forming a user-selected multi-classification reaction;
    receiving, by the computing device, a user selection of a first combination of contents of the at least one combination of content options via the social network user interface, thereby forming a user-selected combination of contents corresponding to the user-selected multi-classification reaction, wherein the at least one combination of content options comprises a detected contact of the user within the social media network; and
    rendering, by the computing device, a supplemented digital image that includes the user-selected multi-classification reaction superimposed over or near a select portion of the digital image on the social network as an animated icon, wherein the select portion of the digital image corresponds to the user-selected first combination of contents.

2. The computer-implemented method of claim 1, wherein the cognitive image analysis comprises a type of analysis selected from the group consisting of gesture recognition of a gesture performed by a person captured in the digital image; object recognition of an object captured in the digital image, and location recognition of a location captured in the digital image.

3. The computer-implemented method of claim 2, wherein the select content classes are each based on a single element in the digital image.

4. The computer-implemented method of claim 2, wherein the select content classes are each based on multiple elements in the digital image.

5. The computer-implemented method of claim 1, wherein: the supplemental digital image comprises at least one icon representative of the user-selected multi-classification reaction.

6. The computer-implemented method of claim 1, wherein:
    the the animated icon is representative of at least a first reaction of the user-selected multi-classification reaction;
    the user-selected first combination of content options are associated with the select portion of the digital image and a second portion of the digital image; and
    the animated icon is superimposed over the digital image and moves between the select portion of the digital image and the second portion of the digital image.

7. The computer-implemented method of claim 1, further comprising:
    receiving, by the computing device, a user selection of a second combination of contents of the at least one combination of content options, thereby forming a second user-selected combination of contents corresponding to the user-selected multi-classification reaction, wherein the select portion of the digital image is further determined based on the second combination of contents.

8. The computer-implemented method of claim 1, wherein the at least one combination of contents comprises a plurality of content classes selected from the group consisting of a detected person, a combination of detected people, a detected object, a detected action, and a detected location.

9. A computer program product comprising a computer readable storage medium having program instructions embodied therewith, the program instructions executable by a computing device to cause the computing device to:
    determine, using a cognitive image analysis, a plurality of content classes associated with content of a digital image on a social network using computer-based image processing tools to generate a classified image;
    obtain user profile data of a user in response to the user accessing the classified image on the social network, wherein the user profile data includes user interest categories of the user;
    determine, using a cognitive image analysis, select content classes from the plurality of content classes based on the select content classes matching the one or more of the user interest categories of the user;
determine at least one combination of contents in the digital image corresponding to at least two of the select content classes;
provide selectable reactions to the user via a social network user interface, wherein the selectable reactions each represent a different user reaction to the classified image;
provide selectable text-based content options associated with content objects of the classified image to the user via the social network user interface based on the select content classes;
receive a user selection of a multi-classification reaction via the social network user interface, thereby forming a user-selected multi-classification reaction;
receive a user selection of a first combination of contents of the at least one combination of content options via the social network user interface, thereby forming a user-selected combination of contents corresponding to the user-selected multi-classification reaction, wherein the at least one combination of content options comprises a detected contact of the user within the social media network; and
render a supplemented digital image that includes the user-selected multi-classification reaction superimposed over or near a select portion of the classified image on the social network as an animated icon, wherein the select portion of the classified image corresponds to the user- selected first combination of contents.

10. The computer program product of claim 9, wherein the cognitive image analysis comprises a type of analysis selected from the group consisting of gesture recognition of a gesture performed by a person captured in the digital image; object recognition of an object captured in the digital image, and location recognition of a location captured in the digital image.

11. The computer program product of claim 10, wherein the content classes are each based on single element in the classified image.

12. The computer program product of claim 10, wherein the content classes are each based on multiple elements in the classified image.

13. The computer program product of claim 9, wherein: the supplemental digital image comprises at least one icon representative of the user-selected multi-classification reaction.

14. The computer program product of claim 9, wherein:
the the animated icon is representative of at least a first reaction of the user-selected multi-classification reaction;
the user-selected first combination of content options are associated with the select portion of the classified image and a second portion of the classified image; and
the animated icon is superimposed over the image and moves between the select portion of the classified image and the second portion of the classified image.

15. The computer program product of claim 9, wherein the user-selected content option comprises a first user-selected content option, and wherein the program instructions are further executable by the computing device to cause the computing device to:
receive a user selection of a second combination of contents of the at least one combination of content options, thereby forming a second user-selected combination of contents corresponding to the user-selected multi-classification reaction, wherein the select portion of the digital image is further determined based on the second combination of contents.

16. A system comprising:
a processor, a computer readable memory and a computer readable storage medium associated with a computing device;
program instructions to obtain user profile data of a user in response to the user accessing a classified image on a social network, wherein the user profile data includes user interest categories of the user, and wherein the classified image is associated with content classes based on content of the classified image;
program instructions to determine, using a cognitive image analysis, a plurality of content classes matching one or more of the user interest categories of the user;
program instructions to receive a user selection of a first combination of contents of the at least one combination of content options from the user via a social network user interface, thereby forming a user-selected combination of contents corresponding to the user-selected multi-classification reaction, wherein the at least one combination of content options comprises a detected contact of the user within the social media network;
program instructions to receive a user selection of a multi-classification user reaction icon from the user via the social network user interface, thereby forming a user-selected reaction multi-classification icon; and
program instructions to render the user-selected multi-classification reaction icon superimposed over or near a select portion of the classified image on the social network as an animated icon that corresponds to the user-selected first combination of contents;
wherein the program instructions are stored on the computer readable storage medium for execution by the processor via the computer readable memory.

17. The system of claim 16, further comprising:
program instructions to determine, using the cognitive image analysis, the content classes associated with the classified image, wherein the content classes are based on content of the classified image;
program instructions to determine at least one combination of contents in the digital image corresponding to at least two of the select content classes;
program instructions to provide a plurality of selectable user reaction icons to the user, including the user-selected reaction icon; and
program instructions to provide the text-based content options to the user.

18. The system of claim 16, wherein the content classes are each based on multiple elements in the classified image.

19. The system of claim 18, wherein:
the user-selected content option is associated with multiple portions of the classified image; and
the animated user-selected reaction icon is superimposed over the classified image and moves between the multiple portions of the classified image.

20. The system of claim 16,
wherein the cognitive analysis comprises a type of analysis selected from the group consisting of gesture recognition of a gesture performed by a person captured in the digital image; object recognition of an object captured in the digital image, or location recognition of a location captured in the digital image.

* * * * *